US008700762B2

(12) United States Patent
Donadio et al.

(10) Patent No.: US 8,700,762 B2
(45) Date of Patent: Apr. 15, 2014

(54) METHOD FOR MONITORING EVENTS IN A COMMUNICATION NETWORK

(75) Inventors: Pasquale Donadio, Naples (IT); Andrea Paparella, Busto Arsizio (IT); Roberto Riglietti, Vimercate (IT)

(73) Assignee: Alcatel Lucent, Paris (FR)

( * ) Notice: Subject to any disclaimer, the term of this patent is extended or adjusted under 35 U.S.C. 154(b) by 235 days.

(21) Appl. No.: 12/459,260

(22) Filed: Jun. 29, 2009

(65) Prior Publication Data
US 2010/0017508 A1 Jan. 21, 2010

(30) Foreign Application Priority Data
Jul. 4, 2008 (EP) ..................................... 08425465

(51) Int. Cl.
*G06F 15/173* (2006.01)
(52) U.S. Cl.
USPC .......................................... 709/224; 709/226
(58) Field of Classification Search
USPC .......................................................... 709/224
See application file for complete search history.

(56) References Cited

U.S. PATENT DOCUMENTS

| 5,933,604 | A | 8/1999 | Inakoshi |
| 6,473,407 | B1 | 10/2002 | Ditmer et al. |
| 6,477,667 | B1 | 11/2002 | Levi et al. |
| 7,051,337 | B2 * | 5/2006 | Srikantan et al. ............. 719/318 |
| 7,529,830 | B2 * | 5/2009 | Fujii .............................. 709/224 |
| 7,647,395 | B2 * | 1/2010 | Sando ........................... 709/223 |
| 7,769,880 | B2 * | 8/2010 | Paka et al. ..................... 709/231 |
| 7,895,641 | B2 * | 2/2011 | Schneier et al. .................. 726/3 |
| 2002/0161680 | A1 * | 10/2002 | Tarnoff ........................... 705/35 |
| 2004/0139048 | A1 * | 7/2004 | Kerr et al. ......................... 707/1 |
| 2008/0228915 | A1 * | 9/2008 | Tamura ......................... 709/224 |
| 2008/0243858 | A1 * | 10/2008 | Dos Remedios et al. ....... 707/10 |

FOREIGN PATENT DOCUMENTS

EP 0 903 889 3/1999

* cited by examiner

*Primary Examiner* — Lynn Feild
*Assistant Examiner* — Keyvan Emdadi
(74) *Attorney, Agent, or Firm* — Carmen Patti Law Group, LLC

(57) ABSTRACT

There is described a method for monitoring at a management terminal events of a given type occurring in a communication network. The communication network comprises a plurality of network elements. The management terminal has a browser suitable for supporting a web like management graphic interface. The method comprises: at one of the network elements, providing a monitoring module; at the management terminal, transmitting to the monitoring module a request for monitoring the events of the given type, the request including an access token suitable for obtaining authorization to access a monitoring channel between the monitoring module and the management terminal; at the monitoring module: listening for possible management information relative to the events, each time the management information are received, processing it to generate updating data, using the access token for accessing the monitoring channel and transmitting the updating data to the management terminal through the monitoring channel.

17 Claims, 3 Drawing Sheets

Figure 3a

| ReqID | Addr | Token | Serv | Cxt |
|---|---|---|---|---|
| | | ... | | |
| 3 | 192.168.1.250 | 20:40:45:80 | ALARM | WDM |

RRTbl

Figure 3b

| Serv | Pr |
|---|---|
| ALARM | 1 |
| PM | 2 |
| LOG | 3 |
| Generic MSG | 4 |

PTbl

Figure 3c

| ReqID | Addr | Status | Serv1Num | Serv2Num | ... | Serv3Num | Serv4Num | SeqNum | Cxt |
|---|---|---|---|---|---|---|---|---|---|
| 3 | 192.168.1.250 | active | 0 | 0 | ... | 0 | 0 | 0 | WDM |

RSUTbl

METHOD FOR MONITORING EVENTS IN A COMMUNICATION NETWORK

FIELD OF THE INVENTION

The invention is based on a priority application EP08425465.5 which is hereby incorporated by reference.

The present invention relates to the field of communication network management. In particular, the present invention relates to a method for monitoring events occurring in a communication network. The present invention further relates to a system and a network element suitable to implement the above method.

BACKGROUND OF THE INVENTION

As it is known, managing a communication network provides to perform a number of operations (which are termed "management operations" in the following description), such as for instance:
 monitoring network performance;
 configuring network elements and their resources (boards, ports, cross-connections, etc.);
 managing errors occurring in the network; etc.

Typically, the management operations are performed by an apparatus which is termed "network management station or system" (or, briefly, NMS), which is connected to each network element of the network to be managed.

In particular, the NMS is provided with a software application which is termed "manager", capable of exchanging information with software applications which are termed "agent", which agents are placed at the network elements. Manager and agents exchange each other management information by using a management protocol, which is dependent on the type of communication network. Examples of management protocols are SNMP (Simple Network Management Protocol), CMIP (Common Management Information Protocol), Q3, and TL1.

The NMS is typically capable of supporting one or more management graphic interfaces. Each management graphic interface allows an operator responsible of the network management to display management information relative to the network elements and their resources, such as for instance:
 resource configuration parameters, i.e. the set of parameters which are defined by the operator upon activation of the resource (identifier, state, etc.);
 resource performance parameters, i.e. the set of parameters which permit resource performance (rate, error rate, etc.) to be estimated during resource operation; and
 alarms, i.e. management messages which are transmitted by the network elements to the NMS to indicate that an anomalous event has been detected (reduction of the power signal level, increase of the error rate, etc.).

The NMS may receive from the communication network management information to be displayed through the management graphic interface according to a first mode which is termed "pull", or according to a second mode which is termed "push".

According to the pull mode, the operator generates by means of the NMS a request for receiving a certain set of management information from one or more network elements. For example, an operator can generate by means of the NMS a request for displaying configuration parameters relative to a certain resource of a network element (e.g., a port or a board). This causes the NMS to transmit to the network element a management message containing a request for receiving values of the configuration parameters relative to the resource. Upon reception of the request, the network element reads the currently stored values of the requested parameters from its local database and transmits them to the NMS by means of a reply message. In this manner, the NMS is capable of reading the reply message and using its contents to display the management graphic interface with the requested parameter values.

On the contrary, according to the push mode, when a given event occurs in the network, one or more network elements spontaneously transmit to the NMS a certain set of management information indicative of the event, thus notifying the operator of the event substantially in real time. The push mode is typically used for notifying the operator of events which occur in the communication network at times which are not predictable by the operator, such as for instance alarm generation or changing of one or more performance parameters. Generally, the NMS allows an operator to formulate one or more requests for monitoring a certain set of events, and to display corresponding notification messages on the currently open graphic interface. For example, an operator can formulate a request for monitoring time changes of the performance parameters of a certain resource. In this manner, the operator is notified substantially in real time of the possible time changes of the performance parameter value.

SUMMARY OF THE INVENTION

The Applicant has noticed that, in the field of the communication networks, it is desirable to provide network element management systems based on web technology. This is mainly due to the fact that management systems operating in this way advantageously allow to use management graphic interfaces similar to graphic interfaces of current computer programs for browsing the web (which are commonly termed "web browsers"), such as Mozilla, Internet Explorer, etc. In the following of the description, such interfaces are referred to as "web-like management graphical interfaces".

The Applicant has noticed that a management system could thus be implemented through a browser executed by the NMS and capable of supporting a web-like management graphical interface, wherein the management information are displayed as graphic objects typical of the web interfaces, i.e. windows, icons, etc.

Further, the Applicant has noticed that current network elements have a remarkable amount of calculation resources (i.e. processor power and memory area), which could be used by the NMS for performing management operations.

In this way, it would not be more necessary to provide the NMS of an amount of calculation resources which allows it to execute all the management operations, as also the network elements would provide their calculation resources. Therefore, the NMS could be replaced by a management terminal having substantially one browser to support the web-like management interface and to access to the network elements.

Disadvantageously, the web-like technology upon which the web-like management interface is based does not provide that an operator can formulate one or more requests for receiving management information in push mode. In particular, the web-like technology does not allow the operator to formulate the above mentioned requests for monitoring a certain set of events that may occur in the communication network. Therefore, disadvantageously, in the event of using a web-like management graphic interface, the operator can not be notified substantially in real time about events which occur in the communication network at times that are not predictable by the operator.

To solve this problem, it would be possible to simulate a push mode by configuring the browser in such a way that it periodically asks the communication network for receiving a certain set of management information. However, this disadvantageously involves a waste of resource, since the transmission of the management information requested from the network by the management terminal occurs at every period even if any event has not happened to be notified to the operator.

Therefore, the Applicant has faced the problem of providing a method for monitoring events of a given type occurring in a communication network, which allows the management terminal to receive from the communication network management information in push mode, thus notifying the operator of the events substantially in real time, even when the management terminal has a web-like management graphic interface, while using the network resources in a more efficient way than the above mentioned solution.

According to a first aspect, the present invention provides a method for monitoring at a management terminal events occurring in a communication network, the communication network comprising a plurality of network elements, the management terminal having a browser suitable for supporting a web like management graphic interface, the method comprising the following steps:
a) providing a monitoring module at one of the plurality of network elements;
b) transmitting, from the browser to the monitoring module, a request for monitoring the events, the request including an access token suitable for obtaining authorization to access a monitoring channel between the monitoring module and the management terminal;
c) at the monitoring module, listening for possible management information relative to the events transmitted from one or more of the plurality of network elements;
d) at the monitoring module, each time the management information are received, processing it to generate updating data; and
e) at the monitoring module, using the access token for accessing the monitoring channel and transmitting the updating data to the management terminal through the monitoring channel.

Preferably, step b) further comprises inserting in the request at least one of the following data:
a context datum indicating at least one resource of the communication network, the at least one resource being involved in the events to be monitored;
a service datum indicating a type of the events to be monitored; and
an address of a port of the management terminal.

Preferably, step c) further comprises using the request for updating a request receiving table which stores requests received at the monitoring module from the management terminal, the request receiving table comprising one or more of the following fields:
a field ReqID comprising an identifier of the request;
a field Addr comprising the address of the port of the management terminal;
a field Token comprising the access token;
a field Serv comprising the service datum; and
a field Cxt comprising the context datum.

Preferably, step c) further comprises assigning a priority to the request by looking up a priority table, the priority table associating a priority value to a value of the service datum.

Preferably, step c) further comprises a step of generating a tag, the tag comprising the identifier of the request, the context datum and the priority.

Preferably, step c) further comprises updating a request status update table which stores requests which are active at the monitoring module, the request status update table comprising one or more of the following fields:
a field ReqID comprising an identifier of the request;
a field Addr comprising the address of the port of the management terminal;
a field Status indicating if the request is active, inactive, or temporarily suspended;
a number N of fields Serv1Num, Serv2Num, . . . , ServNNum, each field Serv1Num, Serv2Num, . . . , ServNNum comprising a counter indicating a total number of events of the given type detected at the monitoring module and an identifier of a last event of the given type detected at the monitoring module.

According to a second aspect, the present invention provides a system for monitoring at a management terminal events occurring in a communication network, the communication network comprising a plurality of network elements, the system comprising:
a browser executable at the management terminal and suitable for supporting a web like management graphic interface, and
a monitoring module which is executable at one of the plurality of network elements,
wherein the browser is further suitable for transmitting to the monitoring module a request for monitoring the events, the request including an access token suitable for obtaining authorization to access a monitoring channel between the monitoring module and the management terminal, and
wherein the monitoring module is configured for:
listening for possible management information relative to the events transmitted from one or more of the plurality of network elements;
each time the management information are received, processing it to generate updating data; and
using the access token for accessing the monitoring channel and transmitting the updating data to the management terminal through the monitoring channel.

According to a third aspect, the present invention provides a network element of a communication network cooperating with a management terminal having a browser suitable for supporting a web like management graphic interface, the communication network comprising a plurality of network elements, wherein the network element comprises a monitoring module suitable for:
receiving from the monitoring terminal a request for monitoring the events, the request including an access token suitable for obtaining authorization to access a monitoring channel between the monitoring module and the management terminal;
listening for possible management information relative to the events transmitted from one or more of the plurality of network elements;
each time the management information are received, processing it to generate updating data; and
using the access token for accessing the monitoring channel and transmitting the updating data to the management terminal through the monitoring channel.

BRIEF DESCRIPTION OF THE DRAWINGS

The present invention will be better understood by reading the following detailed description, given by way of example and not of limitation, to be read by referring to the accompanying drawings, wherein:

FIGS. 3a, 3b and 3c show three data structures used by the monitoring module shown in FIG. 1.

DETAILED DESCRIPTION OF PREFERRED EMBODIMENTS OF THE INVENTION

Figure 1:
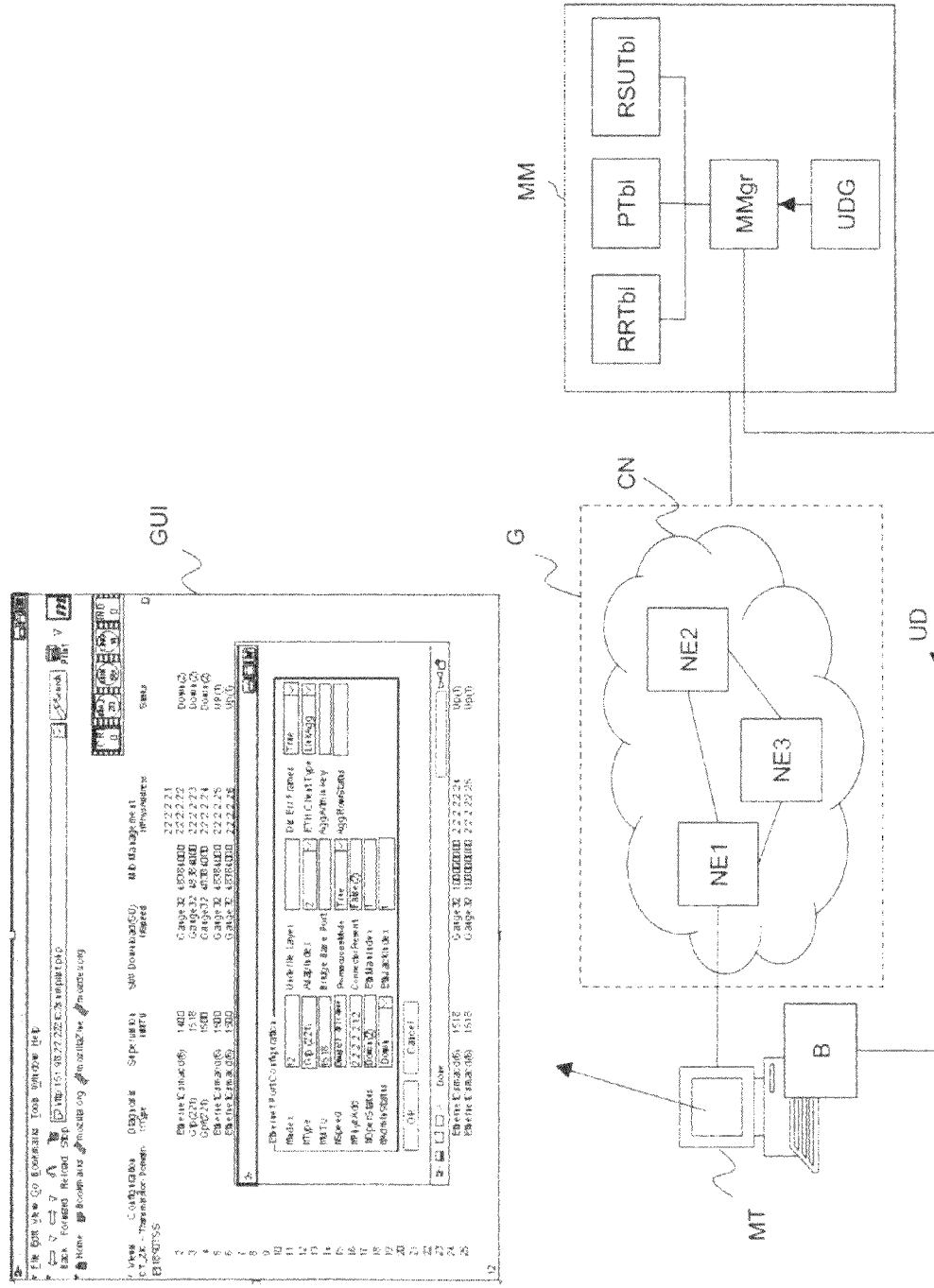
FIG. 1 schematically shows a communication network configured to implement the method according to an embodiment of the present invention.

FIG. 1 schematically shows a communication network CN configured to implement the method according to an embodiment of the present invention.

For simplicity, it is assumed that the communication network CN comprises only three network elements NE1, NE2 and NE3. Obviously, this is merely exemplary, since the communication network CN may comprise any number of network elements. The connections between the network elements NE1, NE2 and NE3, which connections support transmission of user traffic, are not shown in FIG. 1, since they are not useful to the present description.

Preferably, the network elements NE1, NE2, NE3 form part of a same calculation grid G. As it is known, a calculation grid allows to execute distributed applications, i.e. it allows to share execution of a given application among all the computers forming the grid. In other words, the application is shared among all the computers forming the grid. The computers forming the grid communicate with each other via web by means of an application which is termed "middleware". An exemplary calculation grid is the one proposed by the Globus Alliance, which uses the middleware Globus.

According to this embodiment, the network elements NE1, NE2 and NE3 of the communication network CN are then connected the one to the others via web by means of a middleware. The Applicant has performed some positive tests by using the above mentioned middleware Globus.

Preferably, the communication network CN is further connected to a management terminal MT, which is configured to execute a browsing module B and is connected to anyone of the network elements of the grid G, e.g. the network element NE1. The browsing module B is capable of supporting a web-like management graphic interface GUI.

As above mentioned, the web-like management graphic interface GUI is suitable for displaying management information relative to the management of the communication network CN as graphic objects, such as windows and icons.

According to embodiments of the present invention, the communication network CN cooperates with a monitoring module MM.

The monitoring module MM preferably comprises a monitoring manager MMgr and an updating data generator UDG. Preferably, the monitoring manager MMgr is capable of cooperating with a request receiving table RRTbl, a priority table PTbl, and a request status update table RSUTbl.

The monitoring module MM may be implemented as a software module, a hardware module, or as a module having a software portion and a hardware portion. In the event the monitoring module MM is a software module, it is preferably suitable for being executed by the network element through which the management terminal MT enters the grid G, i.e. the network element NE1, in the exemplary communication network of FIG. 1. Alternatively, the monitoring module MM may be executed by any other network element of the calculation grid G. Alternatively, the execution of the monitoring module MM may be shared between two or more network elements of the calculation grid G.

Preferably, the monitoring module MM is capable of:
receiving from the management terminal MT a request of monitoring a certain type of events that may occur in the communication network CN, the request including an access token suitable for obtaining authorization to access a monitoring channel MC towards the management terminal MT;

listening for possible management information relative to the certain type of events transmitted from one or more network elements NE1, NE2 and NE3; and each time the management information are received, processing them to generate updating data UD, using the access token for opening the monitoring channel MC, and using the monitoring channel MC for transmitting the updating data UD to the management terminal MT.

Figure 2:
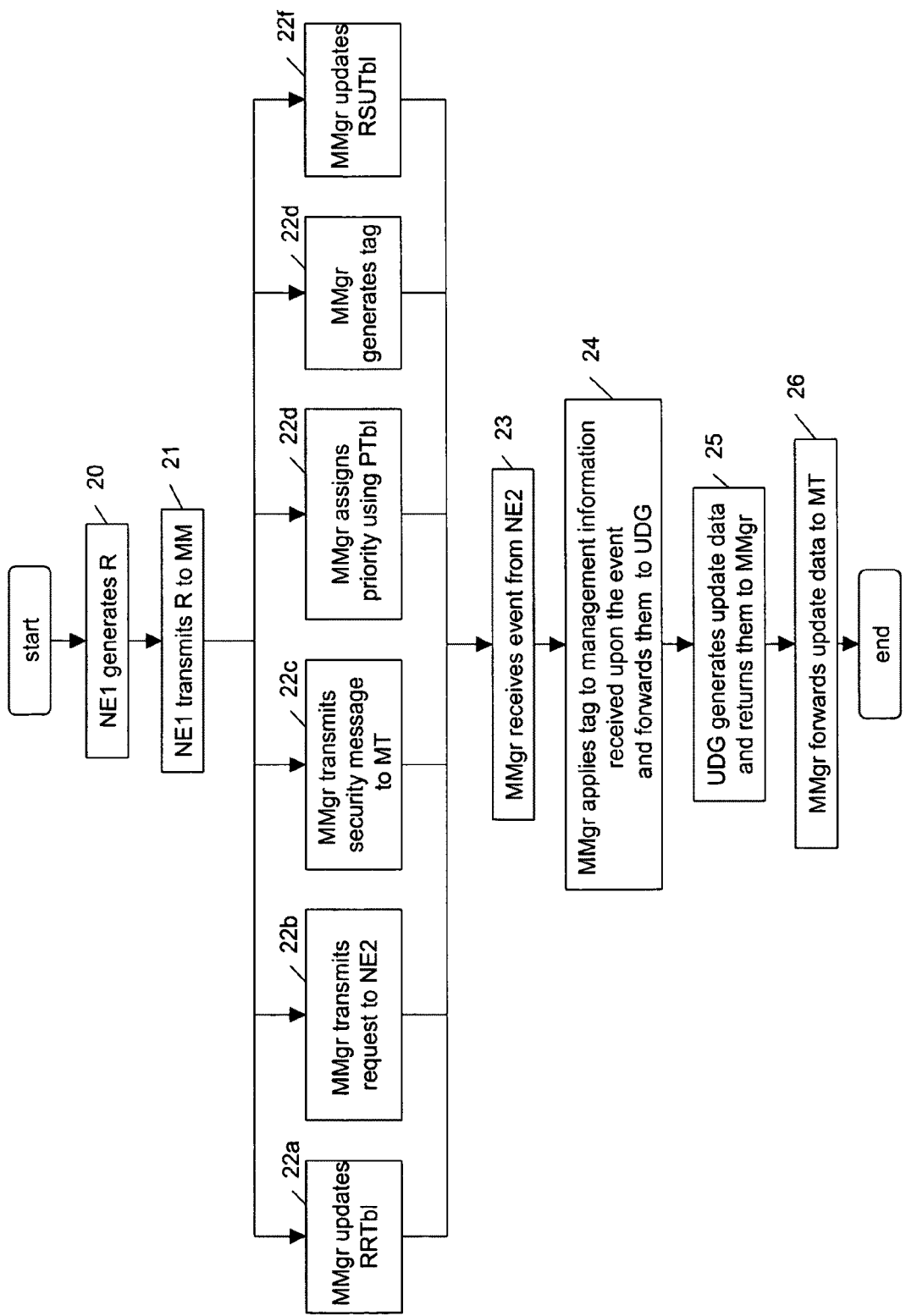
FIG. 2 is a flow chart showing the operation of the monitoring module.

The operation of the monitoring module MM and of its components will be now described in detail by referring to the flow chart of FIG. 2.

It is assumed for example that the web-like graphic management interface GUI comprises a graphic object which allows activation of a function for monitoring possible alarms generated by sub-systems WDM ("Wavelength Division Multiplexing") which are present within the network elements of the communication network CN.

When an operator responsible of managing the communication network CN selects such a graphic object, the browser B notifies the operation to the network element to which the management terminal MT is connected, i.e. NE1, which generates a request R (step 20).

Preferably, the request R comprises a context datum indicating the resources involved in the events that the operator wishes to monitor (in this case, sub-systems WDM of the network elements of the communication network CN). Moreover, the request R preferably comprises a service datum indicating the type of events that the operator wishes to monitor (in this case, generation of alarms). Further, preferably, the request R comprises an address of the management terminal MT. Preferably, the address is an IP address of a port of the management terminal MT (e.g. 192.168.1.250). Further, preferably, the request R comprises an access token. Preferably, the access token is set equal to a sequence of four port identifiers (e.g. 20:40:45:80). For instance, the access token may be set equal to a sequence of four port identifiers (e.g. 20:40:45:80) which are not used by other applications. For assuring that such port identifiers are not used by any other application, each port identifier is preferably summed to an offset value (e.g. 1024).

Then, the network element NE1 transmits the request R to the monitoring module MM (step 21).

Preferably, the monitoring module MM receives the request R by means of its monitoring manager MMgr, which preferably performs a step 22a in which it uses the contents of the request R to update the request receiving table RRTbl, which is shown in FIG. 3a.

Preferably, the request receiving table RRTbl stores the requests received from the management terminal MT. According to embodiments not shown in the drawings, the management of the communication network CN may be performed by means of two or more different management terminals. In this case, the request receiving table RRTbl stores the requests received from all management terminals.

Preferably, for each request, the table RRTbl comprises a row having one or more of the following fields:
a field ReqID comprising a request identifier. For example, the monitoring manager MMgr may assign a progressive integer to each request it receives;

a field Addr comprising the address of the management terminal MT that has generated the request R;

a field Token comprising the access token provided by the management terminal MT that has generated the request R;

a field Serv comprising the service datum provided by the management terminal MT that has generated the request R; and a field Cxt comprising the context datum provided by the management terminal MT that has generated the request R.

FIG. 3a shows that, upon reception of the request R, the monitoring manager MMgr inserts a row within the table RRTbl, whose fields have the following values:

ReqID=3 (assuming that it is the third request received);
Addr=192.168.1.250;
Token=20:40:45:80;
Serv=ALARM; and
Cxt=WDM.

Substantially contemporaneously to step 22a, the monitoring manager MMgr performs a step 22b of transmitting the request R to the network elements to which the context datum Cxt refers, i.e. all the network elements of the communication network CN including sub-systems WDM. For simplicity, it is assumed that only the network element NE2 of the communication network CN includes sub-systems WDM. In this case, in step 22b, the monitoring manager MMgr transmits the request R to the network element NE2, e.g. by means of the middleware of the grid G.

Substantially contemporaneously to steps 22a and 22b, the monitoring manager MMgr performs a step 22c of transmitting to the management terminal MT a security message M comprising the above access token. This will advantageously permit to open in a protected way a monitoring channel MC between the management terminal MT and the network element performing the monitoring module MM to transmit the updating data UD, as it will be described in detail below.

Substantially contemporaneously to steps 22a, 22b and 22c, the monitoring manager MMgr performs a step 22d of looking up the priority table PTbl shown in FIG. 1 in order to assign a priority to the request R.

As shown in FIG. 3b, the priority table PTbl preferably comprises a number of rows equal to the number of values that the service datum may assume, i.e. equal to the number of different types of events that the operator may request to monitor. It is assumed that, in this case, there are four types of possible events:

generation of alarms (service datum: ALARM);
change of performance parameters (service datum: PM);
change in the LOG content (service datum: LOG); and
generation of other management information (service datum: Generic MSG).

Each row of table PTbl preferably comprises a service datum Serv and a priority Pr associated to the service datum Serv. Preferably, the priority related to the service datum Serv indicates the priority with which the associated information received at the monitoring module MM and indicative of an event of the type identified by the service datum Serv have to be processed.

For example, as shown in FIG. 3b, the maximum priority (Pr=1) may be assigned to alarms, a lower priority (Pr=2) may be assigned to performance parameters, an even lower priority (Pr=3) may be assigned to LOG, and a minimum priority (Pr=4) may be assigned to any other management information.

Substantially contemporaneously to steps 22a, 22b, 22c and 22d, the monitoring manager MMgr performs a step 22e of generating a tag T. Preferably, the tag T comprises the identifier of the request contained in the field ReqID of the table RRTbl, the context datum contained in the field Cxt of the table RRTbl, the priority determined in step 22e, a temporal marker indicating the time at which the request R has been forwarded to the network element NE2, and an integer which is initially set up to 1. Referring to the above mentioned example, the tag T generated by the monitoring manager MMgr is thus 3_WDM_1_t1_1, wherein t1 is the temporal marker expressed in hours and minutes (e.g. 10:30).

Substantially contemporaneously to steps 22a, 22b, 22c, 22d and 22e the monitoring manager MMgr performs a step 22f of updating the request status update table RSUTbl shown in FIG. 1.

In particular, as shown in FIG. 3c, for each request active at the monitoring module MM, table RSUTbl comprises a row having one or more of the following fields:

a field ReqID corresponding to the field ReqID of table RRTbl;
a field Addr corresponding to field Addr of table RRTbl;
a field Status indicating if the request is active, inactive, or temporarily suspended;
a number N of fields Serv1Num, Serv2Num, . . . , ServNNum, each corresponding to a respective value that service datum may assume. For example, with reference to the above example, in which there are four different possible values for the service datum (ALARM, PM, LOG and Generic MSG), the table RSUTbl preferably comprises four fields: Serv1Num (for ALARM), Serv2Num (for PM), Serv3Num (for LOG), and Serv4Num (for Generic MSG). Each field Serv1Num, Serv2Num, . . . , ServNNum preferably comprises a counter indicating the total number of events of the type identified by the service datum. Moreover, preferably each field Serv1Num, Serv2Num, . . . , ServNNum comprises an identifier of the last event detected at the monitoring module MM and of the type identified by the service datum;
a field SeqNum comprising an identifier of the last event detected at the monitoring module MM, independently from its type; and
a field Cxt corresponding to the field Cxt of table RRTbl.

FIG. 3c shows that upon reception of the request R, in step 22f, the monitoring manager MMgr inserts within the table RSUTbl a row, whose fields have the following values:

ReqID=3;
Addr=192.168.1.250;
Status=active;
Serv1Num (relative to ALARM)=0 (for simplicity, it is only indicated the counter value);
Serv2Num (relative to PM)=0 (for simplicity, it is only indicated the counter value);
Serv3Num (relative to LOG)=0 (for simplicity, it is only indicated the counter value);
Serv4Num (relative to Generic MSG)=0 (for simplicity, it is only indicated the counter value);
SeqNum is not defined, because it has not been still received any event;
Cxt=WDM.

Thus, the monitoring manager MMgr listens for receiving from the network element NE2 possible management information indicative of events identified by the service datum and occurring at the resources identified by the context datum, i.e. the generation of alarms by the sub-systems WDM.

Preferably, the network elements of the communication network CN are configured for transmitting to the monitoring manager MMgr all the management information relating to the requested event, each time any of such management information changes value.

When, during a step 23, the monitoring manager MMgr receives from the network element NE2 management information indicative of the requested event, i.e. the generation of one or more alarms by sub-systems WDM of the network element NE2, it preferably processes them as described herein after.

First of all, in step 24, the monitoring manager MMgr inserts the received management information into a packet, to which the tag T generated during step 22d is attached, and transmits the tagged packet to the updating data generator UDG by taking into account its priority. Preferably, in step 24, the monitoring manager MMgr further updates the field Serv1Num of the table RSUTbl, by incrementing the counter by 1.

Then, in step 25, the updating data generator UDG preferably extracts from the tagged packet the management information contained therein and process it to generate updating data UD. In particular:
when the UDG determines that the event referred to by the received management information is the first event of the type requested by the request R, it preferably sets the updating data UD equal to the received management information;
when the UDG determines that the event referred to by the received management information is not the first event of the type requested by the request R, it preferably reads from a database (not shown in FIG. 1) the management information indicative of the previous event of the type requested by the request R, and sets the updating data UD equal only to the difference between this information and the management information just received. If these are equal, it is not generated any updating datum.

Then, the updating data generator UDG applies the tag T to the updating data UD possibly generated, and transmits them to the monitoring manager MMgr.

Then, in step 26, the monitoring manager MMgr preferably transmits the updating data UD to the browser B of the management terminal MT, which thus uses them for updating the web-like management graphic interface GUI by generating a graphic object (e.g. a window) which indicates the presence of alarms generated by the sub-systems WDM of the network element NE2.

In particular, in step 26, the monitoring manager MMgr uses the information contained within the tag T for retrieving from the request receiving table RRTbl the address of the management terminal MT to which it has to transmit the updating data UD and the access token, and asks for opening a monitoring channel MC with the port identified by such an address. Preferably, such a monitoring channel MC is a TCP connection.

According to embodiments of the present invention, the updating data UD may be transmitted using a real-time transmission protocol supported by the TCP/IP stack, such as RTP (Real-time Transfer Protocol) or RTSP (Real-Time Streaming Protocol) protocol.

Moreover, preferably, in step 26, the monitoring manager MMgr uses the information contained within the tag T for retrieving from the request receiving table RRTbl the access token associated to the request R, and based on it, transmits a series of identification packets through the monitoring channel MC, in order to obtain by the management terminal MT the authorization of transmitting data through the monitoring channel MC.

When the monitoring manager MMgr receives the authorization by the management terminal MT, it preferably transmits the updating data UD through the monitoring channel MC to the management terminal MT.

Therefore, advantageously, the web-like management graphic interface GUI allows the operator to be notified substantially in real time about the events which may occur in the communication network CN.

Indeed, thanks to the access token mechanism, a monitoring channel is permanently available for transmitting from the monitoring module MM to the management terminal MT any management information indicative of an event of the type specified by the operator.

Therefore, advantageously, for monitoring events of a given type, the operator has to select only once the suitable graphical object on the web-like management interface. Selection of the graphical object induces to transmit the request to the monitoring module. The request is associated to an access token, which is shared by the management terminal MT and the monitoring module UM. The monitoring module MM then uses the access token for opening the monitoring channel each time management information indicative an event of the requested type are received, and uses such a monitoring channel for transmitting updating data UD informing the management terminal MT, substantially in real time, of changes occurred in the management information.

Therefore, advantageously, the management terminal MT does not need any more to transmit periodically the request for receiving updating of the management information. On the contrary, a single request induces creation of a monitoring channel which is automatically opened and used by the monitoring manager MMgr each time the management information have to be updated, i.e. each time an event of the requested type occurs.

Advantageously, the monitoring module MM, which is executed by the network itself (i.e. by one or more of its network elements), manages the requests that it receives from the management terminal MT by asking the request of monitoring events to be fulfilled.

Advantageously, the management of different requests by means of the monitoring module MM takes into account the different priorities assigned to the different services, which priorities are stored in the priority table PTbl. Therefore, requests relative to displaying of any possible alarm are advantageously served with a priority greater than, for example, requests relative to displaying of performance parameters.

Further advantageously, the updating data generator UDG is capable of transmitting only variations of management information, since when it receives information similar to that already stored in its local database (and that thus it has already been transmitted to the management terminal MT, through the monitoring manager MMgr), it does not transmit any updating data UD to the management terminal MT. This advantageously allows resources of the communication network CN and the management terminal MT not to be wasted to process useless data.

Further advantageously, using the access token allows updating data UD to be transmitted from the communication network CN to the management terminal MT by using a connection based on the web technology (and then as such easily accessible), without the risk that non authorized third party enters the connection and manipulates the updating data UD.

Further advantageously, using a dedicated connection for transmitting updating data UD guarantees a high reliability of the transmission with a consequent minimization of the risk of loss of updating data UD.

The invention claimed is:

1. A method for monitoring at a management terminal events occurring in a communication network, said communication network comprising a plurality of network elements, said management terminal having a browser adapted to support a web like management graphic interface, the method comprising the following steps:
   a) providing a monitoring module at one of said plurality of network elements;
   b) transmitting, from said browser to said monitoring module, a request for monitoring said events, said request including an access token adapted to obtain authorization to access a monitoring channel between said monitoring module and said management terminal;
   c) at said monitoring module, listening for possible management information relative to said events transmitted from one or more of said plurality of network elements;
   d) at said monitoring module, each time said management information is received, processing it to generate updating data; and
   e) at said monitoring module, using said access token for accessing said monitoring channel and, using a real time streaming protocol, automatically opening and using said monitoring channel to transmit said updating data regarding said communication network to said management terminal.

2. The method of claim 1, wherein said step b) further comprises inserting in said request at least one of the following data:
   a context datum indicating at least one resource of said communication network, said at least one resource being involved in said events to be monitored;
   a service datum indicating a type of said events to be monitored; and
   an address of a port of said management terminal.

3. The method according to claim 1, wherein said step c) further comprises using said request for updating a request receiving table which stores requests received at said monitoring module from said management terminal, said request receiving table comprising one or more of the following fields:
   a field ReqID comprising an identifier of said request;
   a field Addr comprising said address of said port of said management terminal;
   a field Token comprising said access token;
   a field Serv comprising said service datum; and
   a field Cxt comprising said context datum.

4. The method according claim 1, wherein said step c) further comprises assigning a priority to said request by looking up a priority table, said priority table associating a priority value to a value of said service datum.

5. The method according to claim 1, wherein said step c) further comprises a step of generating a tag, said tag comprising said identifier of said request, said context datum and said priority.

6. The method according to claim 1, wherein said step c) further comprises updating a request status update table which stores requests which are active at said monitoring module, said request status update table comprising one or more of the following fields:
   a field ReqID comprising an identifier of said request;
   a field Addr comprising said address of said port of said management terminal;
   a field Status indicating if said request is active, inactive, or temporarily suspended;
   a number N of fields Serv1Num, Serv2Num, . . . , ServNNum, each field Serv1Num, Serv2Num, . . . , ServNNum comprising a counter indicating a total number of events of said given type detected at said monitoring module and an identifier of a last event of said given type detected at said monitoring module.

7. A system for monitoring at a management terminal events occurring in a communication network, said communication network comprising a plurality of network elements, the system comprising:
   a browser being executed at said management terminal and adapted to support a web like management graphic interface; and
   a monitoring module which is executable at one of said plurality of network elements,
   wherein said browser is further adapted to transmit to said monitoring module a request for monitoring said events, said request including an access token adapted to obtain authorization to access a monitoring channel between said monitoring module and said management terminal, and
   wherein said monitoring module is configured for:
   listening for possible management information relative to said events transmitted from one or more of said plurality of network elements;
   each time said management information is received, processing it to generate updating data; and
   using said access token for accessing said monitoring channel and, using a real time streaming protocol, automatically opening and using said monitoring channel to transmit said updating data regarding said communication network to said management terminal.

8. The system according to claim 7, wherein said browser is further configured to insert in said request at least one of the following data:
   a context datum indicating at least one resource of said communication network, said at least one resource being involved in said events to be monitored;
   a service datum indicating a given type of said events to be monitored; and
   an address of a port of said management terminal.

9. The system according to claim 7, wherein said monitoring module is further configured to store and update a request receiving table which stores requests received at said monitoring module from said management terminal, said request receiving table comprising one or more of the following fields:
   a field ReqID comprising an identifier of said request;
   a field Addr comprising said address of said port of said management terminal;
   a field Token comprising said access token;
   a field Serv comprising said service datum; and
   a field Cxt comprising said context datum.

10. The system according to claim 7, wherein said monitoring module is further configured to store a priority table associating a priority value to a value of said service datum, and to assign a priority to said request by looking up said priority table.

11. The system according to claim 7, wherein said monitoring module is further configured to generate a tag, said tag comprising said identifier of said request, said context datum and said priority.

12. The system according to claim 7, wherein said monitoring module is further configured to store and update a request status update table which stores requests which are active at said monitoring module, said request status update table comprising one or more of the following fields:
- a field ReqID comprising an identifier of said request;
- a field Addr comprising said address of said port of said management terminal;
- a field Status indicating if said request is active, inactive, or temporarily suspended; and
- a number N of fields Serv1Num, Serv2Num, ..., ServNNum, each field Serv1Num, Serv2Num, ..., ServNNum comprising a counter indicating a total number of events detected at said monitoring module and relative to said type of management information corresponding to said service datum and an identifier of a last event detected at said monitoring module and relative to said type of management information corresponding to said service datum.

13. A network element of a communication network cooperating with a management terminal, said communication network comprising a plurality of network elements, wherein said network element comprises a monitoring module adapted to:
- receive from said management terminal a request for monitoring said events, said request including an access token adapted to obtain authorization to access a monitoring channel between said monitoring module and said management terminal,
- listen for possible management information relative to said events transmitted from one or more of said plurality of network elements;
- each time said management information is received, process it to generate updating data; and
- use said access token for accessing said monitoring channel and, using a real time streaming protocol, automatically opening and using said monitoring channel to transmit said updating data regarding said communication network to said management terminal.

14. The method of claim 1, wherein:
said monitoring module comprises a monitoring manager and an updating data generator.

15. The method of claim 14, further comprising the following steps:
f) providing a graphic interface (GUI); and
g) at said monitoring module, using said GUI for displaying said updating data substantially in real time.

16. The system of claim 7, wherein:
said monitoring module comprises a monitoring manager and an updating data generator.

17. The system of claim 16, wherein:
said monitoring manager is configured to cooperate with a request receiving table, a priority table, and a request status update table.

* * * * *